United States Patent [19]
Weisenburger et al.

[11] Patent Number: 5,114,456
[45] Date of Patent: May 19, 1992

[54] DISCHARGING DEVICE FOR A GLASS MELTING FURNACE

[75] Inventors: Siegfried Weisenburger, Au/Rhein; Wolfgang Grünewald, Eggenstein; Hartmut Seiffert, Karlsruhe, all of Fed. Rep. of Germany

[73] Assignee: Kernforschungszentrum Karlsruhe GmbH, Karlsruhe, Fed. Rep. of Germany

[21] Appl. No.: 660,028

[22] Filed: Feb. 25, 1991

[30] Foreign Application Priority Data

Feb. 23, 1990 [DE] Fed. Rep. of Germany ....... 4005748

[51] Int. Cl.$^5$ ............................................. C03B 5/26
[52] U.S. Cl. ........................................ 65/327; 65/128
[58] Field of Search ................. 65/327, 325, 326, 126, 65/128, 129, 132

[56] References Cited

U.S. PATENT DOCUMENTS 3,293,017 12/1966 Jenkins .................................. 65/129
4,402,724 9/1983 Weisenburger et al. ............. 65/128

FOREIGN PATENT DOCUMENTS 2842505 11/1979 Fed. Rep. of Germany .

Primary Examiner—Richard V. Fisher
Assistant Examiner—John Hoffmann
Attorney, Agent, or Firm—Spencer & Frank

[57] ABSTRACT

A discharging device is provided at the bottom of a glass melting furnace. The device includes an inductively heated outlet unit including a compression flange having an inlet opening and an outlet pipe extending from the compression flange to form therewith a unit having a T-shaped cross section. The outlet pipe is penetrated by an outlet channel communicating with the inlet opening. The outlet pipe projects downwardly out of an opening in the furnace. An outlet block is seated on the compression flange and has an outlet channel flush with the inlet opening of the compression flange. An annular supporting flange supports the outlet unit from the bottom against the compression flange, with the annular supporting flange being supported by a bottom carrier plate of the furnace and the outlet pipe of the outlet unit projecting through an opening in the annular supporting flange. A thermal and mechanically deflecting creep barrier is disposed for stopping creep flow of glass melt between the compression flange of the outlet unit and other components of the furnace, including the outlet block, in contact with the compression flange, by freezing the melt and causing a pressure loss in the creep flow with respect to static pressure of the melt in the furnace.

4 Claims, 2 Drawing Sheets 5,114,456

DISCHARGING DEVICE FOR A GLASS MELTING FURNACE

CROSS REFERENCE TO RELATED APPLICATIONS

The present application claims the rights to priority with respect to application Ser. No. P 40 05 748.8 filed Feb. 23, 1990 in the Federal Republic of Germany, the subject matter of which is incorporated herein by reference.

The present application is additionally related to U.S. application Ser. No. 660,029, filed concurrently herewith, entitled "Bottom Outlet Device For A Glass Melting Furnace," and assigned to the same assignee, the subject matter of which is incorporated herein by reference.

BACKGROUND OF THE INVENTION

The present invention relates generally to a continuous and discontinuous discharge of glass melts from a ceramic glass melting furnace in which highly radioactive wastes are to be melted into the glass, with it being possible to measure the volume of glass flow of the melt and to start and stop it at will. More particularly, the invention relates to a discharging device in the bottom of such a glass melting furnace.

The glass melt in such a furnace flows out in liquid state through a special glass discharge channel. When the temperature of the melt drops below the melting temperature, the melt solidifies into solid glass and thus closes the discharge path. In this type of discharging device, the required temperatures are generally generated by inductive heating.

German Pat. No. 2,842,505, as well as corresponding U.S. Pat. No. 4,402,724, discloses a discharging device for a glass melting furnace for radioactive wastes in which difficulties may arise at the start of the glass flow, when the solidified glass is melted, in that temperature fluctuations or temperatures of an insufficient magnitude occur locally. In another discharging device, which is improved over the cited prior art with respect to its starting characteristics in that the discharging device is moved toward the interior of the furnace, the higher temperature levels frequently cause leakage problems in that the glass creeps around the outlet unit of the discharging device. These leakages have been found to occur after several years of use of such discharging devices.

SUMMARY OF THE INVENTION

It is now an object of the present invention to improve a discharging device of this type for glass melts so that leakage flow is no longer possible in the gaps between the heated elements of the discharging device and the furnace components.

The above and other objects are accomplished according to the invention by the provision of a discharging device at the bottom of a glass melting furnace provided with a bottom carrier plate, comprising:

(a) an inductively heated outlet unit including a compression flange having an inlet opening and an outlet pipe extending from the compression flange to form therewith a unit having a T-shaped cross section, the outlet pipe being penetrated by an outlet channel communicating with the inlet opening, the outlet pipe projecting downwardly out of an opening in the furnace;

(b) an outlet block seated on the compression flange and having an outlet channel flush with the inlet opening of the compression flange;

(c) an annular supporting flange having an opening and supporting the outlet unit from the bottom against the compression flange, the annular supporting flange being supported by the bottom carrier plate of the furnace, with the outlet pipe of the outlet unit projecting through the opening in the annular supporting flange; and (d) at least one thermal and mechanically deflecting creep barrier means disposed for stopping creep flow of glass melt between the compression flange of the outlet unit and other components of the furnace, including the outlet block, in contact with the compression flange, by freezing the melt and causing pressure loss in the creep flow with respect to static pressure of the melt in the furnace.

According to the present invention, a thermally and mechanically effective creep barrier is created at the outer edges of the outlet unit, simultaneously creating a cooling zone and forcing multiple deflections around barriers placed against the glass melt so that the melt is prevented from creeping around the outlet unit, thus preventing glass leakages.

Further details of the present invention will now be described in greater detail with reference to the accompanying drawings.

DETAILED DESCRIPTION OF PREFERRED EMBODIMENTS

Figure 1:
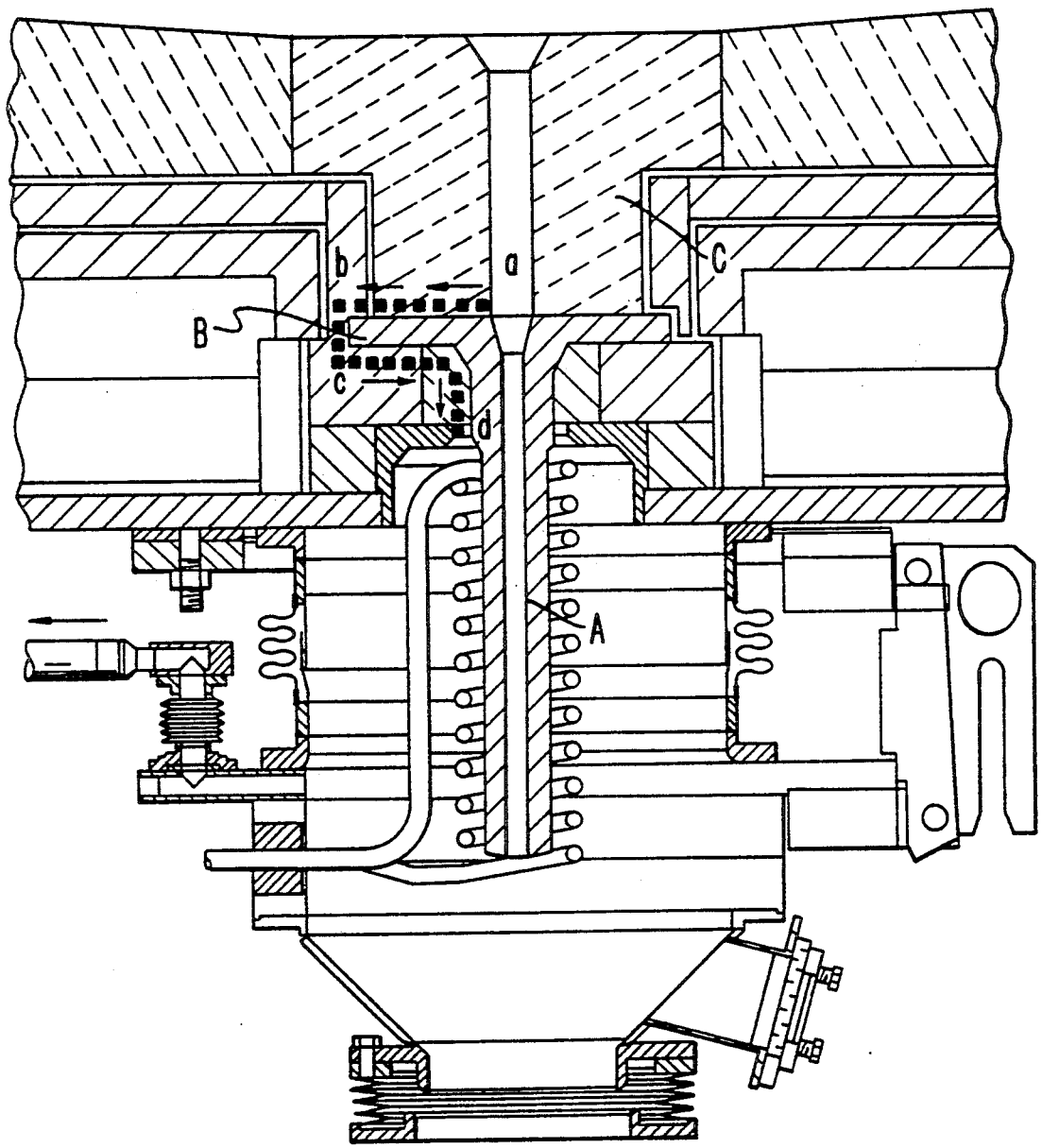
FIG. 1 is a cross sectional view showing the bottom of a glass melting furnace including a conventional discharging device in which the above-mentioned problems occur.

FIG. 1 shows the bottom portion of a glass melting furnace with a conventional discharging device, including an inductively heated outlet unit A, having a head flange B with a T-shaped cross section and a uniform wall thickness, and a ceramic brick outlet block C seated on the head flange. Head flange B is firmly embedded in ceramic bricks, including those of the outlet block C, at the bottom of the furnace. Leakage problems occur due to the heating of the outlet unit. More specifically, the melted glass creeps around the outlet unit A, and more particulary around the head flange B of the outlet unit by way of a path a to d shown by the dotted line in FIG. 1. This is where the present invention begins in order to reduce or make impossible such leakages along path a through d around head flange B and along the downwardly extending shaft of outlet unit A.

Figure 2:
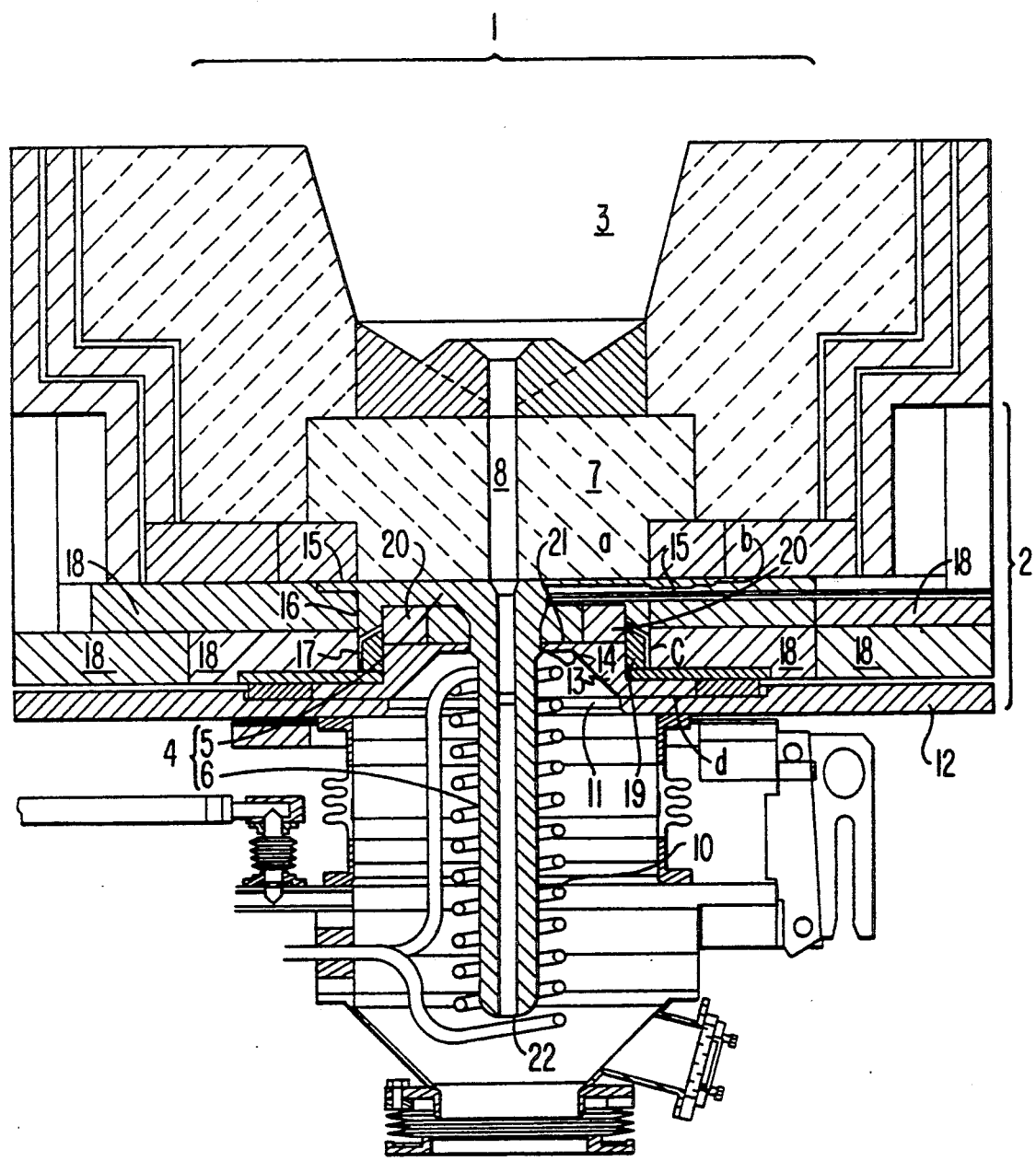
FIG. 2 is a cross-sectional view similar to FIG. 1 and showing the novel discharging device according to the present invention.

FIG. 2 shows the details of the novel discharging device according to the invention which is arranged in a rotationally symmetrical manner below or in the lower portion of the bottom 2 of a ceramic glass melting furnace 1 in which there is disposed a glass melt 3 including melted-in highly radioactive wastes. The furnace is heated by means of electrodes (not shown). The main element of the outlet device is the rotationally symmetrical outlet unit 4 which has a generally T-shaped cross section and is composed in its main portion of solid, electrically conductive material, preferably Inconel 690. The upper end of outlet unit 4 comprises a compression flange 5 having a central inlet opening 5′, and the lower portion of outlet unit 4 comprises an outlet pipe 6 having an outlet channel 9 connecting inlet opening 5′ with a discharge opening 22 at the free end of pipe 6. Outlet unit 4 is seated underneath an outlet block 7 that is penetrated by an outlet channel 8 that is flush with outlet channel 9. The lower portion of outlet channel 9 within outlet pipe 6 is heated inductively by an internally cooled coil 10 encircling outlet pipe 6.

Outlet unit 4 projects through an opening 11 in a support plate 12 which carries furnace 1. Above opening 11, an annular supporting flange 13 is seated on support plate 12 as a supporting connecting element. It also has an opening 14 through which outlet pipe 6 projects at the bottom. The particularities of the novel discharging device become evident at and above annular supporting flange 13.

Compression flange 5 of outlet unit 4 is provided with several thermal and mechanically deflecting barriers against creep flow of the melt around the compression flange. A thermal barrier is here understood to mean a heat-conducting component disposed in the direction of heat flow and which has a lower thermal capacity and is thus cooled faster by its cooler environment. Such a component will cause a creep stream flowing along it to solidify since its particular geometric configuration causes the flow of heat from the heat source (e.g. from heating element 10) to be reduced.

Such a first creep barrier is generated by a horizontal, annular, disc-shaped collar 15 which surrounds and is attached to compression flange 5. Collar 15, which is made of the same material as compression flange 5, has a thinner wall than the compression flange. A second, further creep barrier is formed by a cylindrical wall 16 attached to an outer peripheral area of compression flange 5 which together with compression flange 5 forms a downwardly oriented cup shape. Wall 16 includes a cylindrical collar portion 17 adjacent its free end and made of the same material as the rest of wall 16 while having a thinner wall thickness.

Mechanical barriers which cause a deflection are thus formed by the various angles between the two collars 15 and 17. The gap existing between the surfaces of these collars 15 and 17 and ceramic bricks 18 through 20 at the bottom of the furnace is deflected several times. This inevitably brings about a high pressure loss in any possibly existing creep flow against the static pressure of the hot glass melt 3.

According to a further aspect of the invention, annular supporting flange 13 has an inner radial region which is raised to form an upstanding upper edge surface 21 which projects into the region enclosed by thin collar 17. That is, edge surface 21 lies somewhat higher than the lower edge of collar 17. This overlap creates further barriers in the direction toward opening 14 through which leakage could possibly escape. Through the intermediary of insulating bricks 20, compression flange 5 is supported by edge surface 21.

Ceramic bricks 20 are disposed in the space between edge surface 21 and compression flange 5. Further ceramic bricks 19 fill the cavity in the region of the above-mentioned overlap. Due to their low thermal capacity and poorer thermal conduction, these bricks as well as bricks 18 form lower temperature zones so that a possibly expected creep flow can be stopped be freezing.

The discharge device of the invention works as follows. To discharge the melt 1, outlet unit 4 is inductively heated by means of coil 10. The glass flows out through channels 8 and 9 toward exit opening 22. Because of the above-described creep barriers and their effect, leakages of glass melt are prevented along the exterior face of compression flange 5 toward opening 4.

The significant feature of the discharging device according to the present invention is thus that, seen in the direction of flow of gap a to d as shown by the arrows in FIG. 1, one or a plurality of thermally and mechanically acting creep barriers are disposed between the surface of the upper portion of outlet unit 4, that is, the compression flange 5, and furnace components 7, 18, 19 and 20 in contact with it so as to stop a creep flow of the molten glass by freezing it and reducing its pressure.

Obviously, numerous and additional modifications and variations of the present invention are possible in light of the above teachings. It is therefore to be understood that within the scope of the appended claims, the invention may be practiced otherwise than as specifically claimed.

What is claimed is:

1. A discharging device at the bottom of a glass melting furnace provided with a bottom carrier plate, comprising:
   (a) an inductively heated outlet unit including a compression flange having an inlet opening and an outlet pipe extending from said compression flange to form therewith a unit having a T-shaped cross section, said outlet pipe being penetrated by an outlet channel communicating with said inlet opening, said outlet pipe projecting downwardly out of an opening in the furnace;
   (b) an outlet block seated on said compression flange and having an outlet channel flush with the inlet opening of said compression flange;
   (c) an annular supporting flange having an opening and supporting said outlet unit from the bottom against said compression flange, said annular supporting flange being supported by the bottom carrier plate of the furnace, with the outlet pipe of said outlet unit projecting through the opening in said annular supporting flange; and
   (d) at least one thermal and mechanically deflecting creep barrier means disposed for stopping creep flow of glass melt between said compression flange and other components of the furnace, including said outlet block, in contact with said compression flange, by freezing the melt and causing a pressure loss in the creep flow with respect to static pressure of the melt in the furnace.

2. A discharging device as defined in claim 1, wherein the bottom of the furnace includes insulating bricks and said creep barrier means includes a horizontal, annular, disc-shaped collar disposed around and connected with said compression flange, said collar having a smaller wall thickness than said compression flange and being embedded in insulating bricks at the bottom of the furnace.

3. A discharging device as defined in claim 2, wherein said creep barrier means further includes a downwardly oriented cylindrical wall attached to an outer peripheral area of said compression flange so as to form therewith a downwardly open cup, said cylindrical wall including a cylindrical-shaped collar portion adjacent its free end which has a thinner diameter than the remainder of said cylindrical wall.

4. A discharging device as defined in claim 3, wherein said supporting annular flange includes a radially interior portion which is raised to create an upstanding edge surface; said creep barrier means further includes insulating bricks disposed between said upstanding edge surface and said compression flange so that said compression flange is supported by said upstanding edge surface by way of said insulating bricks; said cylindrical collar has a lower edge which extends below and axially overlaps said upstanding edge surface, creating a cavity in said region of overlap; and the space existing between said annular supporting flange and said compression flange, and said cavity in said region of overlap, respectively, are tightly filled with insulating bricks.

* * * * *